July 7, 1959 L. A. RUSSELL 2,894,151
MAGNETIC CORE INVERTER CIRCUIT
Filed Dec. 20, 1956

INVENTOR.
LOUIS RUSSELL
BY William V. Schelberg
AGENT 2,894,151

MAGNETIC CORE INVERTER CIRCUIT

Louis A. Russell, Poughkeepsie, N.Y., assignor to International Business Machines Corporation, New York, N.Y., a corporation of New York Application December 20, 1956, Serial No. 629,631

8 Claims. (Cl. 307—88)

The invention relates to circuits for performing logical operations in binary information processing systems and is directed in particular to a "not" circuit or inverter device employing magnetic cores.

Due to the economy and inherent reliability of magnetic logical components, their use is highly desirable in data handling systems, however, in many instances diodes are required in circuits interconnecting such magnetic core elements, which diodes consume appreciable power and necessitate employment of cores of the metallic tape variety.

A number of logical components have been devised which avoid the need for diodes in the coupling circuits; as disclosed and claimed in a copending application, Serial Number 528,594, filed August 16, 1955, and another copending application, Serial Number 548,581, filed November 23, 1955, on behalf of Louis A. Russell; and the present invention is directed to a further logical device adapted for employment with these components.

Accordingly, an object of this invention is to provide an improved "inverter" circuit component employing magnetic cores wherein conventionally used diode elements are not required.

A more specific object of the invention is to provide an improved "inverter" circuit wherein lower power requirements are achieved allowing the use of ferrite magnetic core elements with windings of relatively few turns.

Another object is to provide an inverter logical component including saturable coupling cores for controlling the transfer of pulses between cores adapted for information storage.

Other objects of the invention will be pointed out in the following description and claims and illustrated in the accompanying drawings, which disclose, by way of example, the principle of the invention and the best mode, which has been contemplated, of applying that principle.

Figure 1:
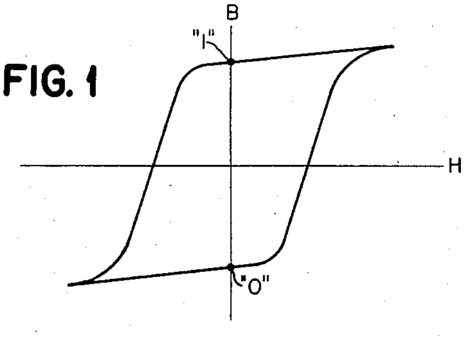
Figure 1 is a representation of the hysteresis characteristic obtained for a rectangular magnetic material of the type employed.

Referring to Figure 1, the curve illustrated comprises a plot of flux density versus applied field for a magnetic core having a substantially rectangular hysteresis characteristic. The opposite remanence states are conventionally employed for representing binary information conditions and are arbitrarily designated as "0" and "1" in the figure. With a zero stored, a pulse applied to a winding linking the core in proper sense causes the loop to be traversed and the remanence state one attained when the pulse terminates. Similarly, the core is read out or returned to the zero state in determining what information has been stored by applying a pulse in the reverse sense to the same or another winding. Should a one have been stored, a large flux change occurs with the shift from one to zero conditions with a corresponding voltage magnitude developed on an output winding. On the other hand, should a zero have been stored, little flux change occurs and a negligible signal is developed on the output winding.

Figure 2:
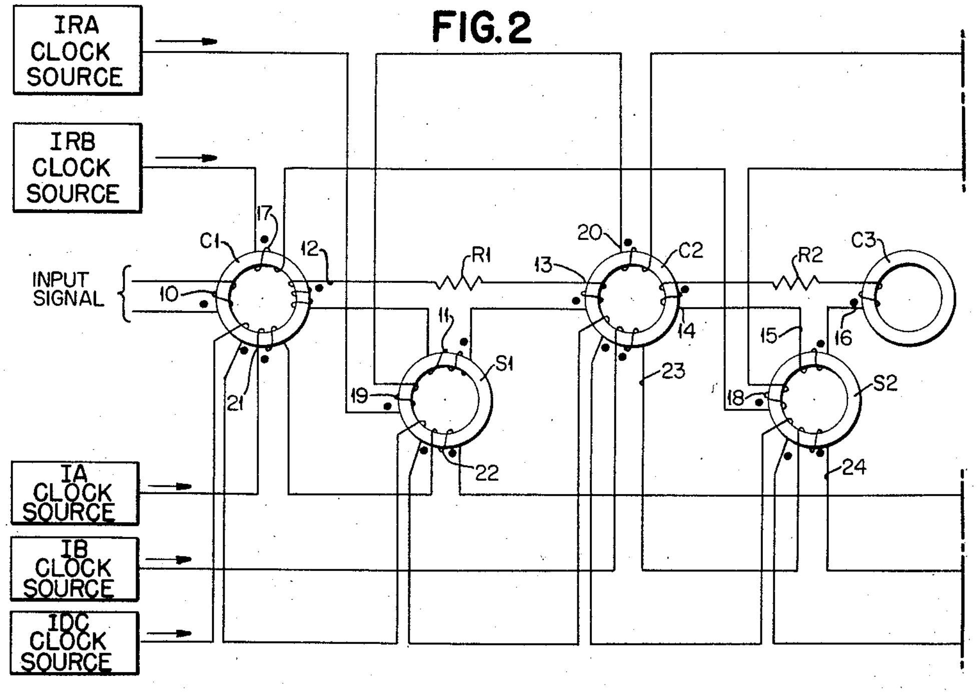
Figure 2 is a circuit diagram of a magnetic core inverter circuit according to the invention.

In accordance with the convention employed heretofore in the above mentioned applications, a dot marking is shown adjacent one winding terminal in Figure 2 indicating its winding direction in that a positive pulse directed into the dotted end tends to apply a negative field or store a zero while a positive pulse into the unmarked terminal tends to store a one. When read-out by a shift caused by a negative field, all windings on the core experience the flux change and develop voltages which are positive at the dot marked terminal and conversely when subjected to a positive field the unmarked terminals are positive.

The system arrangements disclosed in the aforementioned copending applications employ coupling magnetic cores arranged intermediate so called storage magnetic cores which store certain logical information and these arrangements are adapted to be interconnected with the present inverter component through such a coupling core with the output of the inverter likewise delivering its logical information pulse to a further component through such a coupling core.

These coupling cores may be fabricated of ferrite materials like the storage cores however, it is not essential that these cores exhibit the rectangular hysteresis characteristic required of the storage or memory cores as these devices function as variable impedance elements in controlling the transfer of information pulses, as will be more evident from the following description.

Referring now to Figure 2, such an interconnecting coupling core is illustrated at the left of the figure and designated as $C_1$. An input winding 10 is provided on the core $C_1$ and is adapted to be energized with a positive pulse representing a one or with no pulse representing a zero, which information is to be inverted and applied to another logical component. A core $S_1$ is provided that functions to store the input information thus received. The core $S_1$ is adapted to deliver the information in inverted form to another storage core element $S_2$ through a further coupling core $C_2$ wherein the core $S_2$ may comprise a storage core of another logical component. The core $S_1$ is provided with a winding 11 interconnected with an output winding 12 of the core $C_1$ and an input winding 13 of the core $C_2$ through a resistor $R_1$, while an output winding 14 on the core $C_2$ is coupled with a winding 15 on the core $S_2$. The core $C_3$ represents a further coupling core that may be coupled to the storage core $S_2$ through a winding 16 series connected with the windings 14 and 15 through a further resistor $R_2$.

The inverter function is provided by the storage core $S_1$ and information pulses transferred to this core through the coupling core $C_1$ are transferred from this core through coupling core $C_2$ to the following logical stage storage core $S_2$. The coupling cores $C_1$ and $C_2$ are energized from clock pulse sources $I_{RB}$ and $I_{RA}$, respectively, with the pairs of cores $C_1$, $S_1$ and $C_2$, $S_2$ energized from further clock pulse sources $I_A$ and $I_B$, respectively. A winding 17 on core $C_1$ and a winding 18 on core $S_2$ are series connected with the source $I_{RB}$; a winding 19 on core $S_1$ and a winding 20 on core $C_2$ are series connected with source $I_{RA}$; while a winding 21 on core $C_1$ and a winding 22 on core $S_1$ are connected in series with source $I_A$; with a winding 23 on core $C_2$ series connected with a winding 24 on core $S_2$ and the source $I_B$.

The sequence of pulses provided by the several clock pulse sources described above is indicated in Figure 3 and may be observed as being in conformity with that shown in application Serial Number 528,594, aforementioned with which this inverter circuit is adapted to function.

To explain the operation of the component, consider first that all the cores shown are at a zero state or at the lower remanence condition "0" shown in Figure 1. In the event a positive pulse representing a one signal is received on the winding 10 and is applied to the unmarked terminal thereof, core $C_1$ switches from remanence condition "0" to remanence condition "1" and in so doing a flux change is engendered that induces a voltage on the output winding 12 such that the unmarked terminal is positive causing a counter-clockwise current flow in the loop comprising windings 11, 13, 12 and the resistor $R_1$. This current flow is directed into the unmarked terminal of the winding 11 and tends to store a "1" state in this core $S_1$ which shifts from "0" to the "1" remanence state. The current flow into winding 13 of core $C_2$ is in a direction to store a "0" in this core so that it remains at remanence condition "0." At the conclusion of the input pulse, cores $C_1$ and $S_1$ stand at the "1" remanence state and a subsequent clock pulse $I_{RB}$ occurs which is directed into the dot marked terminal of winding 17 of core $C_1$ resetting this couplnig core to "0." The flux change developed in switching from "1" to "0" causes a voltage to be developed across the winding 12 with the dot marked terminal now positive so as to cause a clockwise circulation in the winding loop including windings 11 and 13 and the resistor $R_1$. $I_{RB}$ is such as to switch $C_1$ at a slow enough rate that this clockwise current flow is insufficient to switch core $S_1$ to "0" condition. This loop current is in a direction tending to switch core $C_2$ to the "1" state but due to the loading of its output winding 14 by the winding 15 of core $S_2$ and the input winding 16 of the coupling core $C_3$ which is being driven toward the "0" state simultaneously by $I_{RB}$, there is no shift in state.

Figure 3:
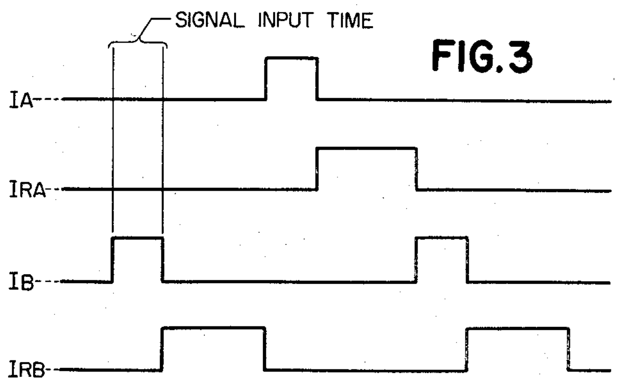
Figure 3 illustrates the relative timing of current pulses which are required for operating the circuit of Figure 2.

After core $C_1$ has been fully reset to the zero state by $I_{RB}$, $I_A$ occurs, as shown in Figure 3. Being directed into the unmarked terminal of winding 22 this clock pulse tends to store a "1" in core $S_1$, however, since $S_1$ was previously switched to "1" remanence by the input signal this pulse fails to cause any appreciable change in flux. Therefore, the driving of core $S_1$ by $I_A$ produces no effect on the core $S_2$ during its input time interval.

Clock pulse $I_{RA}$ follows the termination of $I_A$ and resets core $S_1$ to the zero state again preparing it for receipt of input information during its input interval $I_B$. The information one, represented by a pulse that had previously applied to the input winding 10 of the inverter has at this time been transferred into the next storage position core $S_2$ in inverted form since $S_2$ remains at the "0" remanence condition.

Should the information zero, represented by no pulse or a negative pulse applied to the unmarked termihal of winding 10, been applied to the circuit, then core $C_1$ remains at remanence "0" hence core $S_1$ remains in the "0" state during input time.

$I_{RB}$ is subsequently applied to winding 17 of $C_1$ but since $C_1$ is already at "0" no change occurs while a similar effect is evidenced by this pulse on the winding 18 which tends to switch $S_2$ to the "0" state. $I_A$ is thereafter applied to core $S_1$, again in the direction to switch this core to the "1" remanence state. As $S_1$ switches and a voltage is induced across its winding 11 with the dotted end negative a clockwise current flow is caused in the loop coupling the cores $C_1$, $S_1$ and $C_2$ through the windings 12, 11 and 13. This current flow is into the unmarked terminal of winding 13 of the core $C_2$ and this core switches to the "1" remanence state. The current also is in a direction to switch core $C_1$ to the "1" state but is ineffective since $C_1$ is held at "0" by the $I_A$ pulse flowing through winding 21.

As core $C_2$ switches to the "1" state a voltage is caused to be induced across its winding 14 with the dotted end negative which, in turn, causes current to circulate in the winding loop coupling cores $C_2$, $S_2$ and a further coupling core, not shown, to which core $S_2$ feeds its signal output. This circulating current causes core $S_2$ to switch to the "1" remanence state as it is directed into the unmarked terminal of winding 15.

$I_{RA}$ now occurs and both the storage core $S_1$ and coupling core $C_2$ are reset to zero and, like the resetting of the core $C_1$ by the $I_{RB}$ the rate of switching again maintained at a low enough value so that the voltage induced in the winding 14 on the core $C_2$ causes a small current in the loop including the windings 16 and 15 to avoid resetting core $S_2$.

The information (zero) that had previously been applied to the input of the "inverter" circuit has now been transferred into the next storage position $S_2$ in inverted form since $S_2$ now has attained a "1" remanence state.

The following clock pulse $I_B$ clears core $S_2$ by resetting it to the zero state transferring the information to other components at the time a further signal is made available to the inverter at winding 10 of core $C_1$.

It may be pointed out that both the storage and coupling cores may be of square loop type magnetic material and in such instances a bias current $I_{DC}$ may be provided to a further winding inductively associated with each of them individually which biases the cores toward their positive threshold (write "1" direction) in speeding up the operation of the system.

In the interest of providing a complete disclosure details of one embodiment of the inverter device wherein ferrite cores are employed is given below, however, it is to be understood that other component values and current magnitudes may be employed with satisfactory operation attained so that the values given should not be considered limiting.

With the close pulse currents $I_A$ and $I_B$ delivering a constant current of 1.5 amperes, the windings 21, 22, 23 and 24 may comprise five turns; and clock pulse currents $I_{RA}$ and $I_{RB}$ delivering 0.67 ampere, the windings 17, 18, 19 and 20 may comprise three turns. In the coupling circuits interconnecting the storage and coupling cores, the windings 11 and 15 may comprise ten turns, the windings 10 and 13 may comprise five turns and the windings 12 and 14 twelve turns, with the resistors $R_1$ and $R_2$ of 5.6 ohms.

In this particular embodiment a bias current of 0.25 ampere may be applied to a two turn winding on each core with resetting of the coupling cores taking place within 5 to 7 microseconds. Each of the cores S and C may comprise toroids of magnesium-manganese ferrite composition having an outside diameter of 0.100 inch, inside diameter of 0.070 inch and thickness of 0.120 inch. This thickness may be obtained by stacking four cores each of 0.030 inch thickness and winding the stack as a single core unit.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the following claims.

What is claimed is:

1. In a binary information handling system, a "not" circuit comprising a storage magnetic core, control winding means on said core; a first and a second coupling core associated with said storage core; input and output winding means on each said coupling core; circuit means including a resistor series connecting the control winding on said storage core with the output winding of said first coupling core and the input winding of said second coupling core; a first, second, third and fourth clock pulse source adapted to deliver a series of pulses in sequence displaced in time; winding means on said first coupling core and said storage core connected with said first clock pulse source so as to cause said first coupling core to shift to zero and said storage core to shift to one remanence state when energized; winding means on said second coupling core and said storage core connected with said second clock pulse source so as to cause said second coupling core and said storage core to shift to zero remanence state when energized; winding means on said second coupling core connected with said third clock pulse source so as to cause said second coupling core to shift to zero when energized; winding means on said first coupling core connected with said fourth clock pulse source so as to cause said first coupling core to shift to zero when energized.

2. A magnetic core inverter circuit comprising a storage magnetic core capable of assuming alternate stable residual magnetic states in representing binary information and having a switching threshold, control winding means on said storage core, first and second coupling magnetic cores associated with said storage core, input and output winding means on each of said coupling cores, circuit means connecting the output winding means of said first coupling core with the control winding means of said storage core and the input winding means of said second coupling core, shift winding means on said first coupling core and said storage core adapted to be energized simultaneously and drive said first coupling core toward a datum residual state and said storage core toward the opposite residual state, additional shift winding means on said second coupling core and said storage core adapted to be energized simultaneously and drive said second coupling core toward a datum residual state and said storage core toward a datum residual state, and further shift winding means on said first coupling core adapted to be energized and drive said first coupling core toward the datum residual state.

3. A magnetic core inverter circuit comprising a storage magnetic core, control winding means on said storage core, first and second coupling magnetic cores associated with said storage core, input and output winding means on said coupling cores, circuit means connecting the output winding means of said first coupling core with the control winding means of said storage core and the input winding means of said second coupling core, shift winding means on said first coupling core adapted to drive said core toward a datum residual state when energized by a first clock pulse source, shift winding means on said first coupling core series connected with shift winding means on said storage core adapted to drive said first coupling core toward said datum residual state and said storage core toward the opposite residual state when energized from a second clock pulse source, and shift winding means on said second coupling core series connected with shift winding means on said storage core adapted to drive both said second coupling core and said storage core toward said datum residual state when energized from a third clock pulse source.

4. A magnetic core inverter circuit comprising a storage magnetic core, control winding means on said storage core, first and second coupling magnetic cores associated with said storage core, input and output winding means on said coupling cores, circuit means connecting the output winding means of said first coupling core with the control winding means of said storage core and the input winding means of said second coupling core, shift winding means on said first coupling core adapted to drive said core toward a datum residual state when energized by a first clock pulse source, shift winding means on said first coupling core series connected with shift winding means on said storage core adapted to drive said first coupling core toward said datum residual state and said storage core toward the opposite residual state when energized from a second clock pulse source, shift winding means on said second coupling core series connected with shift winding means on said storage core adapted to drive both said second coupling core and said storage core toward said datum residual state when energized from a third clock pulse source, and means for biasing at least said storage magnetic core toward said opposite residual state.

5. A magnetic core inverter circuit comprising a storage magnetic core, control winding means on said storage core, first and second coupling magnetic cores associated with said storage core, input and output winding means on said coupling cores, circuit means connecting the output winding means of said first coupling core with the control winding means of said storage core and the input winding means of said second coupling core, shift winding means on said first coupling core adapted to drive said core toward a datum residual state when energized by a first clock pulse source, shift winding means on said first coupling core series connected with shift winding means on said storage core adapted to drive said first coupling core toward said datum residual state and said storage core toward the opposite residual state when energized from a second clock pulse source, shift winding means on said second coupling core series connected with shift winding means on said storage core adapted to drive both said second coupling core and said storage core toward said datum residual state when energized from a third clock pulse source, and means for energizing said shift winding means including said first, second and third clock pulse source wherein said sources are actuated in sequence in the order named.

6. A magnetic core inverter circuit comprising a storage magnetic core, first and second coupling magnetic cores associated with said storage core, each of said cores being formed of a magnetic material having a substantially rectangular hysteresis characteristic with a switching threshold, control winding means on said storage core, input and output winding means on said coupling cores, circuit means connecting the output winding means of said first coupling core with the control winding means of said storage core and the input winding means of said second coupling core, shift winding means on said first coupling core adapted to drive said core toward a datum residual state when energized by a first clock pulse source, shift winding means on said first coupling core series connected with shift winding means on said storage core adapted to drive said first coupling core toward said datum residual state and said storage core toward the opposite residual state when energized from a second clock pulse source, shift winding means on said second coupling core series connected with shift winding means on said storage core adapted to drive both said second coupling core and said storage core toward said datum residual state when energized from a third clock pulse source, and means for biasing said cores toward said opposite residual state.

7. A magnetic core inverter circuit comprising a storage magnetic core, first and second coupling magnetic cores associated with said storage core, each of said cores being formed of a magnetic material having a substantially rectangular hysteresis characteristic with a switching threshold, control winding means on said storage core, input and output winding means on said coupling cores, circuit means connecting the output winding means of said first coupling core with the control winding means of said storage core and the input winding means of said second coupling core, shift winding means on said first coupling core adapted to drive said core toward a datum residual state when energized by a first clock pulse source, shift winding means on said first coupling cores series connected with shift winding means on said storage core adapted to drive said first coupling core toward said datum residual state and said storage core toward the opposite residual state when energized from a second clock pulse source, shift winding means on said second coupling core series connected with shift winding means on said storage core adapted to drive both said second coupling core and said storage core toward said datum residual state when energized from a third clock pulse source, means for biasing said cores toward said opposite residual state, and means for energizing said shift winding means including said first, second and third clock pulse source wherein said sources are actuated in sequence in the order named.

8. A magnetic core inverter circuit comprising a storage magnetic core, first and second coupling magnetic cores associated with said storage core, each of said cores being formed of a magnetic material having a substantially rectangular hysteresis characteristic with a switching threshold, control winding means on said storage core, input and output winding means on said coupling cores, circuit means including a resistor series connecting the output winding means of said first coupling core with the control winding means of said storage core and the input winding means of said second coupling core, shift winding means on said first coupling core adapted to drive said core toward a datum residual state when energized by a first clock pulse source, shift winding means on said first coupling core series connected with shift winding means on said storage core adapted to drive said first coupling core toward said datum residual state and said storage core toward the opposite residual state when energized from a second clock pulse source, and shift winding means on said second coupling core series connected with shift winding means on said storage core adapted to drive both said second coupling core and said storage core toward said datum residual state when energized from a third clock pulse source, and means for biasing said cores toward said opposite residual state, and means for energizing said shift winding means including said first, second and third clock pulse source wherein said sources are actuated in sequence in the order named.

References Cited in the file of this patent

UNITED STATES PATENTS

| | | |
|---|---|---|
| 2,708,722 | Wang | May 17, 1955 |
| 2,742,632 | Whitely | Apr. 17, 1956 |